W. E. COPITHORN.
DEMOUNTABLE VEHICLE RIM.
APPLICATION FILED FEB. 14, 1916.
1,191,065.
Patented July 11, 1916.
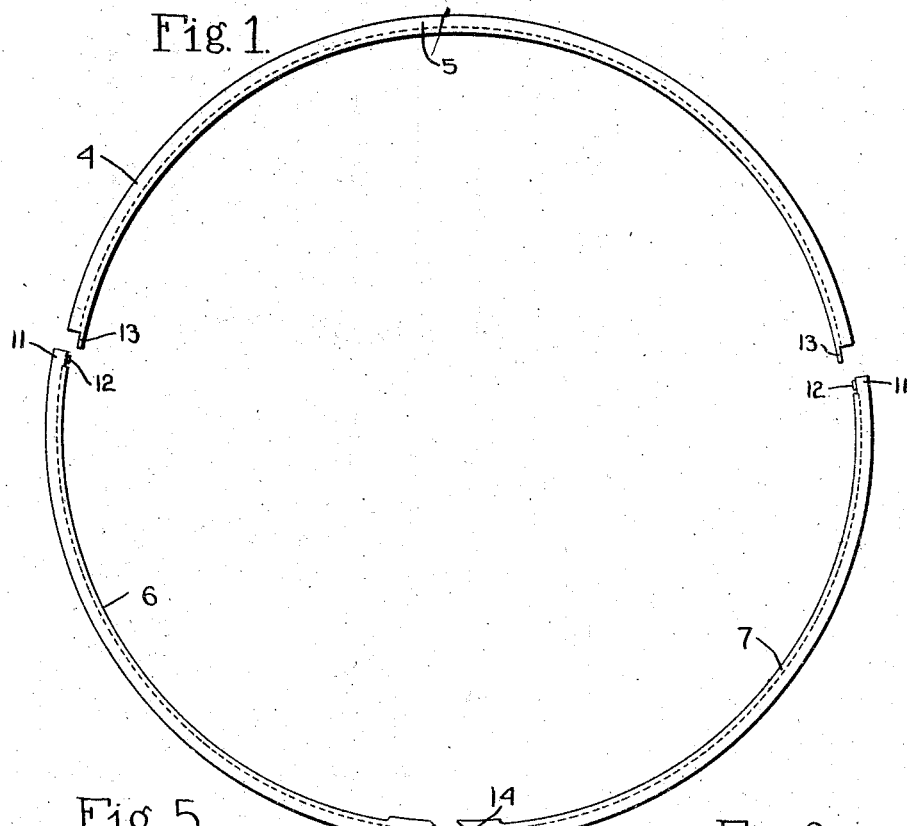
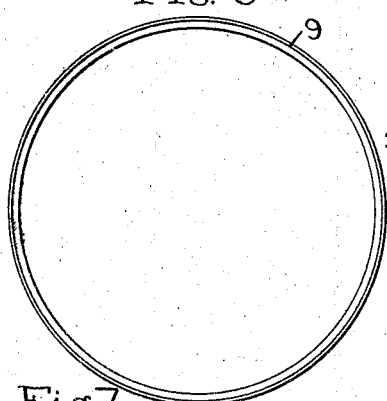
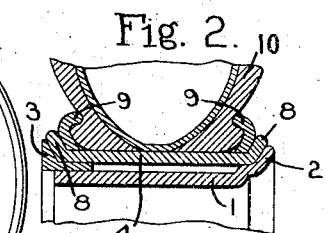
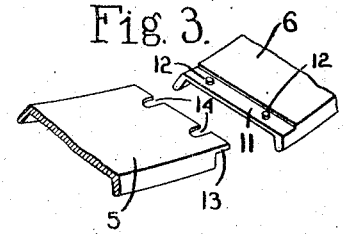
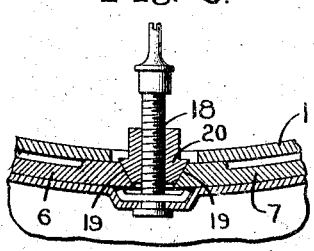
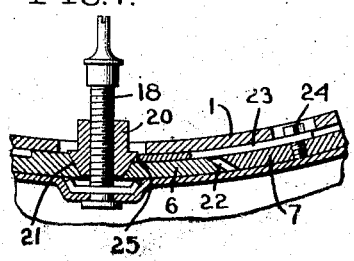
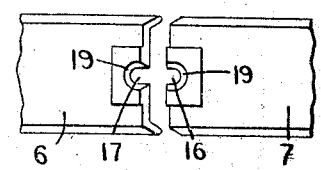
Inventor.
Walter E. Copithorn
by Heard Smith & Tennant
Attys

UNITED STATES PATENT OFFICE.

WALTER E. COPITHORN, OF NATICK, MASSACHUSETTS.

DEMOUNTABLE VEHICLE-RIM.

1,191,065.  Specification of Letters Patent.  Patented July 11, 1916.

Continuation in part of application Serial No. 2,253, filed January 14, 1915. This application filed February 14, 1916. Serial No. 78,126.

*To all whom it may concern:*

Be it known that I, WALTER E. COPITHORN, a citizen of the United States, residing at Natick, county of Middlesex, State of Massachusetts, have invented an Improvement in Demountable Vehicle-Rims, of which the following description, in connection with the accompanying drawing, is a specification, like characters on the drawing representing like parts.

This invention relates to demountable rims for automobile and other vehicle wheels and it has for its object to provide a novel demountable rim which is made in sections and is so constructed that when the rim is removed from the wheel it can be readily collapsed so as to facilitate the removal of the tire therefrom.

My improved demountable rim comprises a base member made in three sections, two tire-engaging rings that encircle the base member and which engage the edges of the tire, and means to expand the sectional base member outwardly into firm contact with the hoop-like tire-engaging rings thereby to make a solid structure. The tire can be quickly and readily taken off from the demountable rim by simply releasing the expanding means and allowing the sections of the ring to collapse.

In order to give an understanding of my invention, I have illustrated in the drawing a selected embodiment thereof which will now be described after which the novel features will be pointed out in the appended claim.

Figure 1 is a side view of the sectional base member of my improved demountable rim; Fig. 2 is a transverse sectional view through the rim of a wheel having my improved demountable rim mounted thereon; Fig. 3 is a fragmentary perspective view of the joint between two of the sections of the base member; Fig. 4 is a plan view of the joint between two other sections; Fig. 5 is a side view of one of the tire-engaging rings; Fig. 6 is a longitudinal sectional view through the portion of the rim through which the valve stem of the tire extends; Fig. 7 shows a modification.

My improved demountable rim is capable of use on any automobile wheel and as the invention does not relate to the wheel body, I have not deemed it necessary to illustrate a complete wheel body. I have, however, shown at 1 the rim member of a wheel body which may be either in the form of the usual felly-band of a wheel body or may be the rim of a wire wheel. This wheel body rim is shown as having a flange 2 at one edge against which one edge of the demountable rim rests and as having at the other edge a removable locking ring 3 by which the demountable rim is locked in position. This locking ring may have any suitable or usual construction, but will preferably be constructed similarly to the locking ring shown in my co-pending application Se. No. 2253, filed January 14, 1915.

My improved demountable rim comprises a so-called base member or tire-receiving rim 4 which is made in three sections 5, 6 and 7. This tire-receiving rim is provided at each edge with the lip or flange portion 8. Encircling the tire-receiving rim are two tire-engaging rings 9 which will be clencher rings if the tire to be used is a clencher tire, or will be straight-sided rings if the tire is a straight-sided tire. These rings 9 are integral non-expansible hoop-like structures which encircle the tire-receiving rim 4 and are held in position thereon by the lips or flanges 8.

10 indicates a portion of a tire which is mounted on my improved rim.

As stated above, the base member or tire-receiving rim 4 is made in three sections 5, 6 and 7. The section 5 is provided at each end with the lip 11 having one or more projections 12 extending therefrom and one end of each of the sections 6 and 7 is provided with the extension or lip 13 adapted to overlie the lip or flange 11 of the section 5 and provided with slots 14 shaped to receive the pins 12. When the ends of the sections 6 and 7 are in proper position relative to the ends of the section 5, the rim 4 will present a smooth interior surface. The meeting ends of the sections 6 and 7 are beveled, as shown at 14 and 15, respectively, and are provided with notches 16, 17 which when the sections are together form an opening for the valve stem 18 of the tire. The walls of these notches 16 and 17 are beveled, as shown at 19, to fit a cone-shaped nut 20 that is adapted to be screwed to the valve stem 18. When the nut is screwed up on the valve stem, the engagement thereof with the beveled surfaces 19 of the notches 16 and 17 tends to separate the sections 6 and 7 of the rim 4 and thus expand the latter.

In assembling the parts the three sections of the rim 4 are placed within the tire 10 with the rings 9 on each side of the tire, and in proper engagement therewith. The nut 20 is then screwed onto the valve stem 18 of the tire and is screwed firmly against the bevel faces 19. This operation expands the base member 4 outwardly into firm engagement with the hoop-like rings 9 which serve to limit the expanding movement thereof. When the nut 20 is screwed up tight the sectional ring will be firmly held against the hoop-like members 9 and a solid structure will be presented. To remove the tire from the rim involves simply taking off the nut 20 thereby allowing the sectional rim 4 to be broken down and removed.

In Fig. 7 I have shown a modification of the invention wherein the opening for the valve stem 18 is situated at one side of the meeting ends of the sections 6 and 7. In this embodiment of the invention the section 6 is provided with an opening 21 through which the valve stem 18 extends, said opening being situated at one side of the joint 22 between the sections 6 and 7. The section 7 has a strap 23 secured thereto at 24, the end 25 of which is adapted to be engaged by the nut 20 when the latter is screwed up. With this construction the tightening of the nut 20 will expand the rib section 4, as in the construction above described.

While I have illustrated herein some selected embodiments of my invention, I do not wish to be limited to the constructional features shown.

This application is a continuation of my application, Se. No. 2253, filed January 14, 1915, so far as it relates to the construction shown in Figs. 1 to 6 inclusive.

I claim:

A demountable rim comprising a base member having a shape to present a central tire receiving portion, and a lip or flange at each edge thereof, said base member being made in a plurality of separable sections, the end of one section having an extension or lip and the adjacent end of the next section having a flange adapted to underlie said extension, said extension and flange provided with projections and slots respectively adapted to interlock the sections, two tire-holding rings encircling said base member and engaging the lips thereof, and means applied to said rim and coöperating with the adjacent ends of said other sections of the base member thereby to expand said base member outwardly into firm engagement with the tire holding rings.

In testimony whereof, I have signed my name to this specification.

Dr. WALTER E. COPITHORN.